United States Patent
Matthis et al.

(10) Patent No.: US 8,328,243 B2
(45) Date of Patent: Dec. 11, 2012

(54) MARMON FLANGE TO SPHERICAL ADAPTER

(75) Inventors: Alexander R. Matthis, Portland, OR (US); Gregor Reimann, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 64 days.

(21) Appl. No.: 12/850,456

(22) Filed: Aug. 4, 2010

(65) Prior Publication Data

US 2011/0037258 A1    Feb. 17, 2011

Related U.S. Application Data

(60) Provisional application No. 61/233,056, filed on Aug. 11, 2009.

(51) Int. Cl.
*F16L 17/00*    (2006.01)
(52) U.S. Cl. .................. 285/367; 285/365; 285/223
(58) Field of Classification Search .................. 285/365, 285/366, 367, 233, 234, 414, 416, 223
See application file for complete search history.

(56) References Cited

U.S. PATENT DOCUMENTS

| | | | |
|---|---|---|---|
| 825,810 A | 7/1906 | Cooke | |
| 870,557 A * | 11/1907 | Haus | 285/378 |
| 1,093,868 A | 4/1914 | Leighty | |
| 1,232,129 A * | 7/1917 | Wafer | 285/386 |
| 2,029,798 A | 2/1936 | Schellin | |
| 2,269,664 A * | 1/1942 | Hallerberg | 285/332.3 |
| 2,449,625 A | 9/1948 | Stuart, II | |
| 2,706,849 A | 4/1955 | Miller | |
| 2,852,282 A * | 9/1958 | Smisko et al. | 285/112 |
| 3,139,293 A | 6/1964 | Franck | |
| 3,455,582 A | 7/1969 | von Hoevel | |
| 3,468,563 A | 9/1969 | Duret | |
| 3,724,878 A | 4/1973 | Ford | |
| 3,752,509 A * | 8/1973 | Stafford | 285/334.4 |
| 3,913,955 A | 10/1975 | Teja | |
| 3,964,773 A | 6/1976 | Stade et al. | |
| RE28,912 E | 7/1976 | Stade et al. | |
| 4,077,657 A | 3/1978 | Trzeciak | |
| 4,856,826 A | 8/1989 | Engel et al. | |
| 4,924,913 A | 5/1990 | Pedersen | |
| 5,226,679 A | 7/1993 | Klinger | |
| 5,415,439 A | 5/1995 | Wells | |
| 5,421,594 A | 6/1995 | Becerra | |
| 5,441,313 A | 8/1995 | Kalahasthy | |
| 5,449,208 A | 9/1995 | Fox | |
| 5,472,242 A | 12/1995 | Petersen | |
| 5,560,619 A | 10/1996 | Acree | |
| 5,819,326 A | 10/1998 | Kobayashi et al. | |
| 6,092,811 A | 7/2000 | Bojarczuk et al. | |
| 6,245,400 B1 | 6/2001 | Tzeng et al. | |
| 6,508,491 B1 * | 1/2003 | Ebinger et al. | 285/223 |

(Continued)

*Primary Examiner* — Aaron Dunwoody
(74) *Attorney, Agent, or Firm* — Klarquist Sparkman, LLP

(57) ABSTRACT

A conduit coupling includes first and second conduits, an annular adapter and a clamp. The first conduit has an annular flange on an outer surface adjacent to a first end. The adapter is coupled to the outer surface of the first conduit and has an annular first engagement surface positioned adjacent to the flange and an annular second engagement surface that is spherical and convex. The second conduit has a flared end with an inner surface and an outer surface. The inner surface includes an adapter engagement surface that is spherical and concave and engageable with the second engagement surface. The outer surface includes a clamp engagement surface and the clamp includes a flared end engagement surface that is engageable with the clamp engagement surface. The clamp is configured to urge the flared end, adapter and annular flange together.

16 Claims, 4 Drawing Sheets

U.S. PATENT DOCUMENTS

| | | |
|---|---|---|
| 7,399,005 B2 | 7/2008 | Rigollet et al. |
| 7,430,811 B2 | 10/2008 | Williams et al. |
| 7,520,539 B2 | 4/2009 | Ignaczak et al. |
| 2006/0284420 A1 | 12/2006 | Dole |

* cited by examiner

MARMON FLANGE TO SPHERICAL ADAPTER

CROSS REFERENCE TO RELATED APPLICATION

This application claims the benefit of U.S. Provisional Patent Application Ser. No. 61/233,056, filed Aug. 11, 2009.

FIELD

The present disclosure relates to conduit couplings, such as for vehicle exhaust systems, that allow for misalignment of joined conduits while maintaining a seal therebetween.

BACKGROUND

Examples of known conduit couplings in the field are described in U.S. Pat. Nos. 3,964,773 and 5,415,439.

SUMMARY

Described herein are embodiments of conduit couplings having spherical engagement surfaces that allow for misalignment between joined conduits while maintaining a seal between the conduits.

In one embodiment, a conduit coupling includes a first conduit, a second conduit, an annular adapter and a clamp. The first conduit has an annular flange on an outer surface of the first conduit adjacent to an end of the first conduit. The annular adapter is coupled to the outer surface of the first conduit and has an annular first engagement surface positioned adjacent to the flange and an annular second engagement surface that is spherical and convex and spaced from and opposed to the first engagement surface. The second conduit has a flared end with an inner surface and an outer surface. The inner surface includes an adapter engagement surface that is spherical and concave and engageable with the second engagement surface of the adapter. The outer surface of the flared end includes a clamp engagement surface and the clamp includes a flared end engagement surface that is engageable with the clamp engagement surface. The clamp is configured to urge the annular flange, the adapter, and the flared end together upon tightening the clamp.

In another embodiment, a conduit coupling includes first and second conduits and an annular adapter. The first conduit has a first longitudinal center axis, a first end portion, and an annular flange on an outer surface of the first end portion. The second conduit has a second longitudinal center axis and a flared end portion, the flared end portion having an inner surface including an adapter engagement surface that is spherical and concave. The annular adapter is held in compression and forms a sealed joint between the first and second conduits. The adapter has an annular first engagement surface positioned adjacent to the flange and an annular second engagement surface that is spherical and convex. The second engagement surface is spaced from and opposed to the first engagement surface and the adapter engagement surface is engaged with the second engagement surface. The sealed joint is maintainable while the second conduit is misaligned relative to the first conduit in each of, and in combinations of, the following manners: (1) translated in a direction of the longitudinal center axis of the first conduit, (2) rotated about the longitudinal center axis of the second conduit, and (3) pivoted about a point on the longitudinal center axis of the first conduit.

In some embodiments, the annular adapter comprises a rigid middle portion sandwiched between first and second gasket portions.

In some embodiments, the spherical engagement surfaces have substantially the same center of curvature and/or substantially the same radii of curvature.

DETAILED DESCRIPTION

Figure 1:
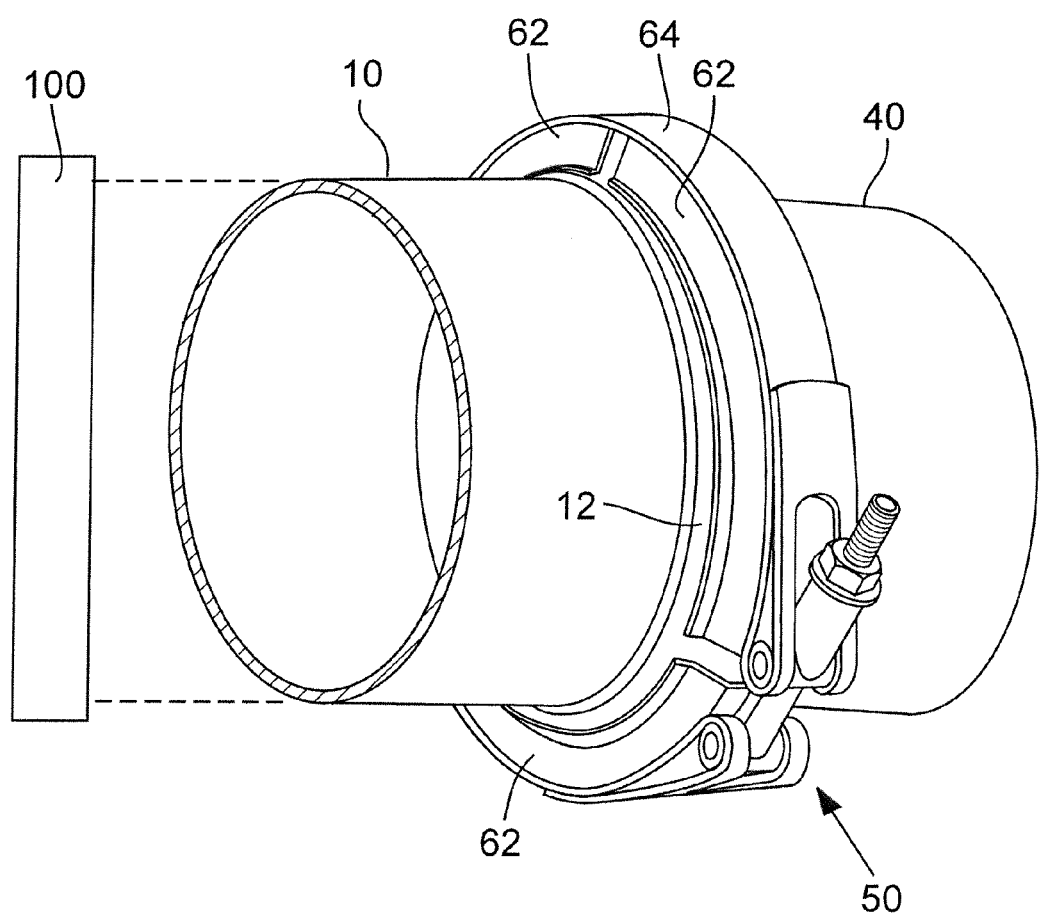
FIG. 1 is a perspective view of an exemplary conduit coupling.

With reference to FIGS. 1-3A, a component or conduit 10, such as a pipe from an engine or exhaust after treatment device (for example, the engine or exhaust after treatment device 100 shown in FIG. 1), is shown to which an annular marmon flange 12 is mounted on an outer surface of the pipe 10 adjacent to an end portion 14 of the pipe 10. The marmon flange 12 includes first and second side surfaces 16, 18 and an interior surface 20 spaced from a base portion with a base surface 22 mounted to the exterior of pipe 10. In this example, side surfaces 16, 18 include portions that converge moving from base surface 22 toward the interior surface 20. A portion of flange 12 that includes surfaces 16 and 18 can be frustoconical in cross-section. The side surface 18 is closer to end portion 14 of pipe 10 than side surface 16.

Figure 3:
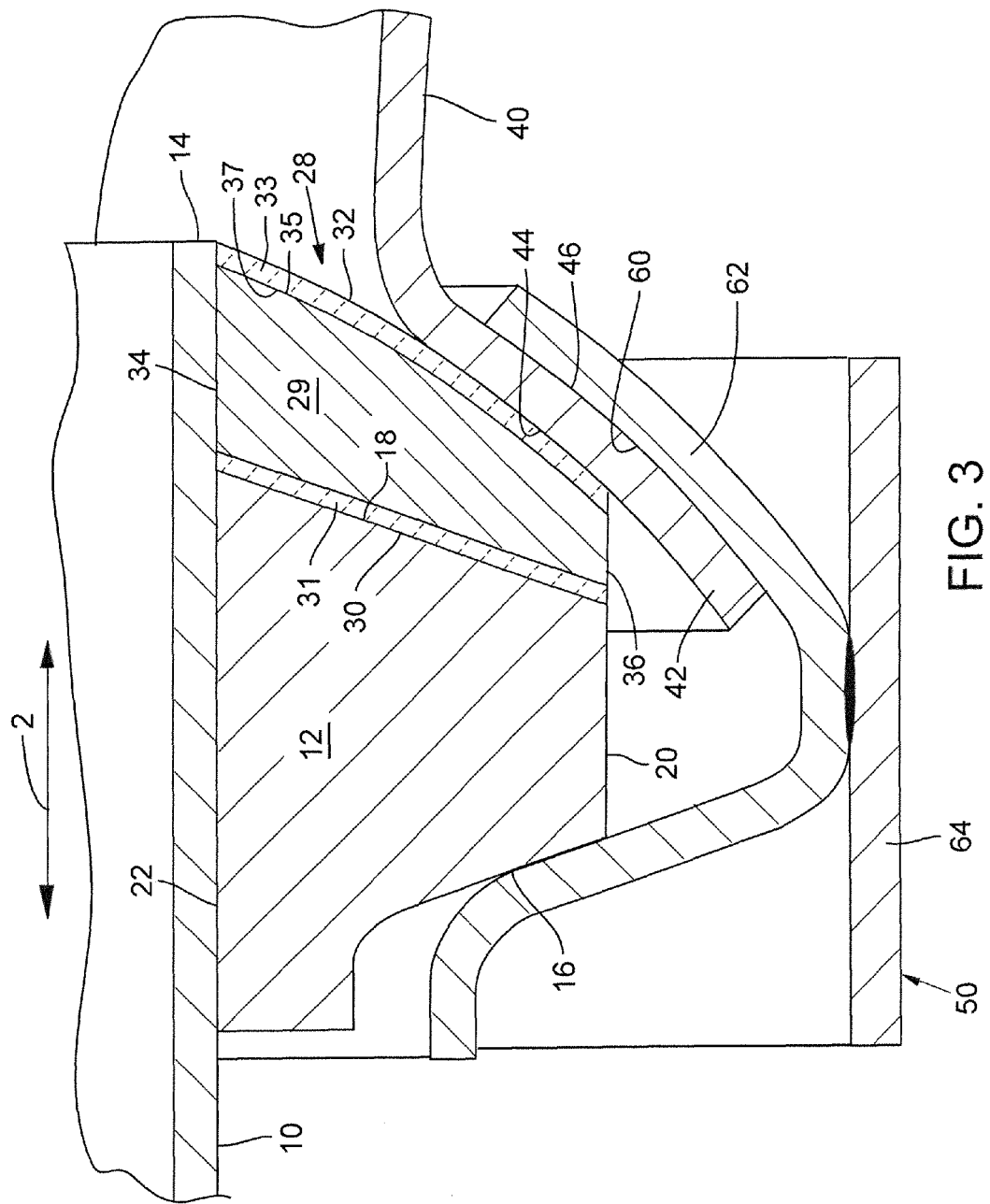
FIG. 3 is a cross-sectional view of a portion of a conduit coupling, according to one embodiment.
Figure 3A:
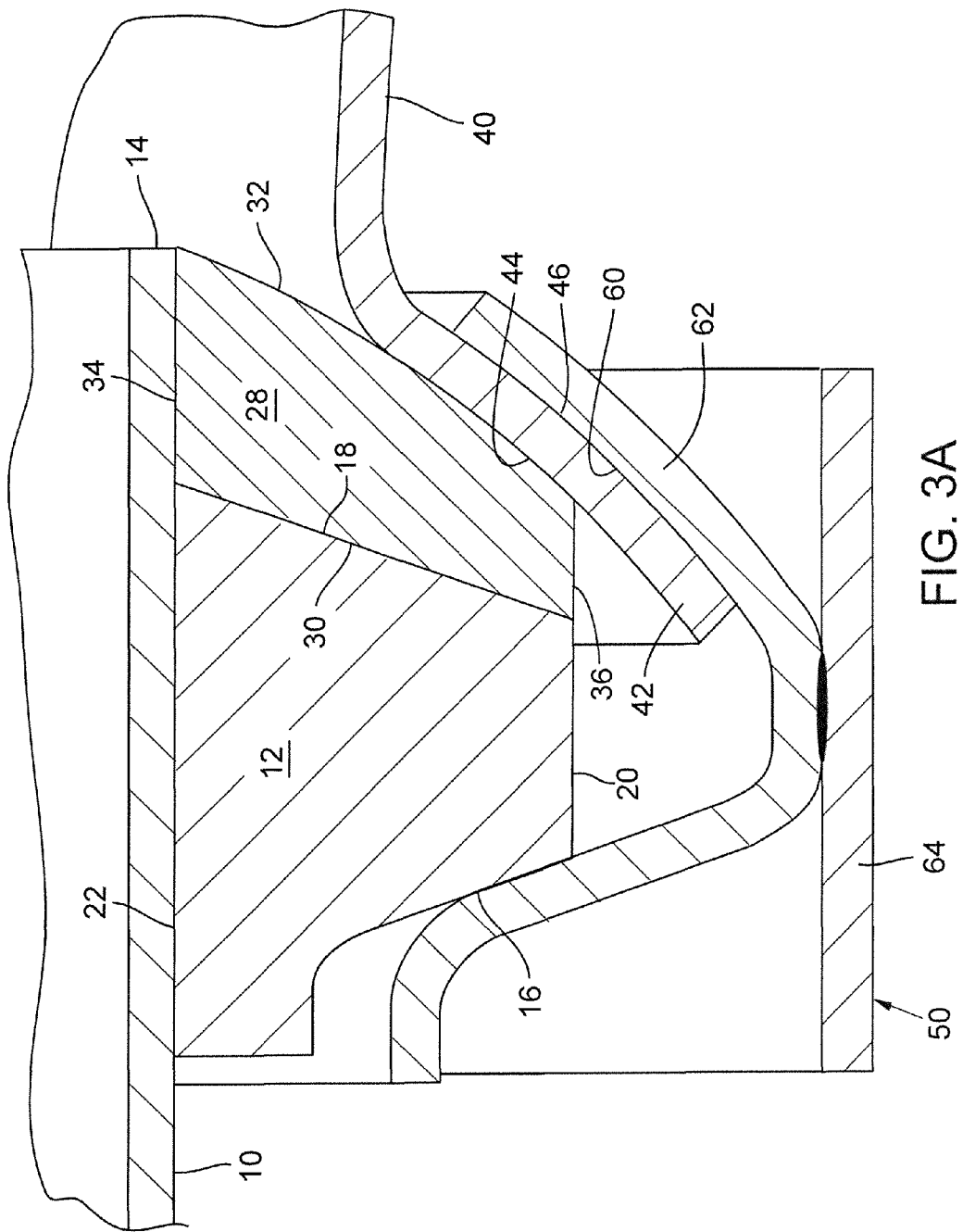
FIG. 3A is a cross-sectional view of a portion of a conduit coupling, according to another embodiment.

An annular gasket or adapter 28 is shown with a first annular side engagement surface 30 abutting or adjacent to side surface 18 and a second annular side engagement surface 32 opposed to side surface 30 and spaced farther from side surface 18 than side surface 30. Adapter 28 has a base portion with a base surface 34 adjacent to the pipe 10 and an interior surface 36 spaced from base surface 34. As shown in FIGS. 3 and 3A, the cross-sectional shape of adapter 28, taken in an axial direction (see arrow 2 in FIG. 3), can be substantially trapezoidal with the surface 32 being slightly convex. The first and second engagement surfaces of the adapter 28 can converge moving away from a longitudinal center axis of the first conduit. Adapter 28 can comprise a resiliently deformable gasket material, such as a high temperature tolerant material, with an example being a carbon ceramic material from Teconnex. As shown in FIG. 3A, the adapter 28 can be a monolithic gasket sealing component. As an alternative (see FIG. 3), adapter 28 can be a sandwich of a rigid middle portion 29 (e.g., steel) between inner and outer gaskets or sealing components 31 and 33, respectively. Middle portion 29 can have the shape of the adapter 28 of FIG. 3A. In this embodiment, the surface 35 of middle portion 29 comprises a convex annular surface that is more desirably spherical and the inner surface 37 of gasket 33 adjacent to surface 35 comprises a matching concave surface that is also desirably spherical.

A component or conduit 40, to be joined to pipe/component 10, can comprise a flared end portion 42 having an annular concave interior surface, or adapter engagement surface, 44 and an annular convex exterior surface, or clamp engagement surface, 46. These surfaces 44, 46 are desirably annular spherical surfaces. A portion of interior surface 44 is shown abutting a portion of the outer side surface 32 of the adapter 28. A portion of exterior surface 46 of flared end portion 42 is shown engaged with a portion of an interior surface, or flared end engagement surface, 60 of a clamp segment 62. Interior surface 60 is desirably an annular concave surface and more desirably a spherical surface that matches the curvature of surface 46. Another portion of the interior surface 60 of the clamp segment 62 can engage the second side surface 16 of the flange 12. The segment 62 is coupled, as by welding, to a clamp ring 64 of a clamp 50 (see FIG. 1) that can be tightened in a conventional manner to draw plural (e.g., three) clamp segments 62 together and clamp, or urge, the flared end portion 42, the adapter 28, and the flange 12 together to seal the components 10 and 40 together.

Figure 2:
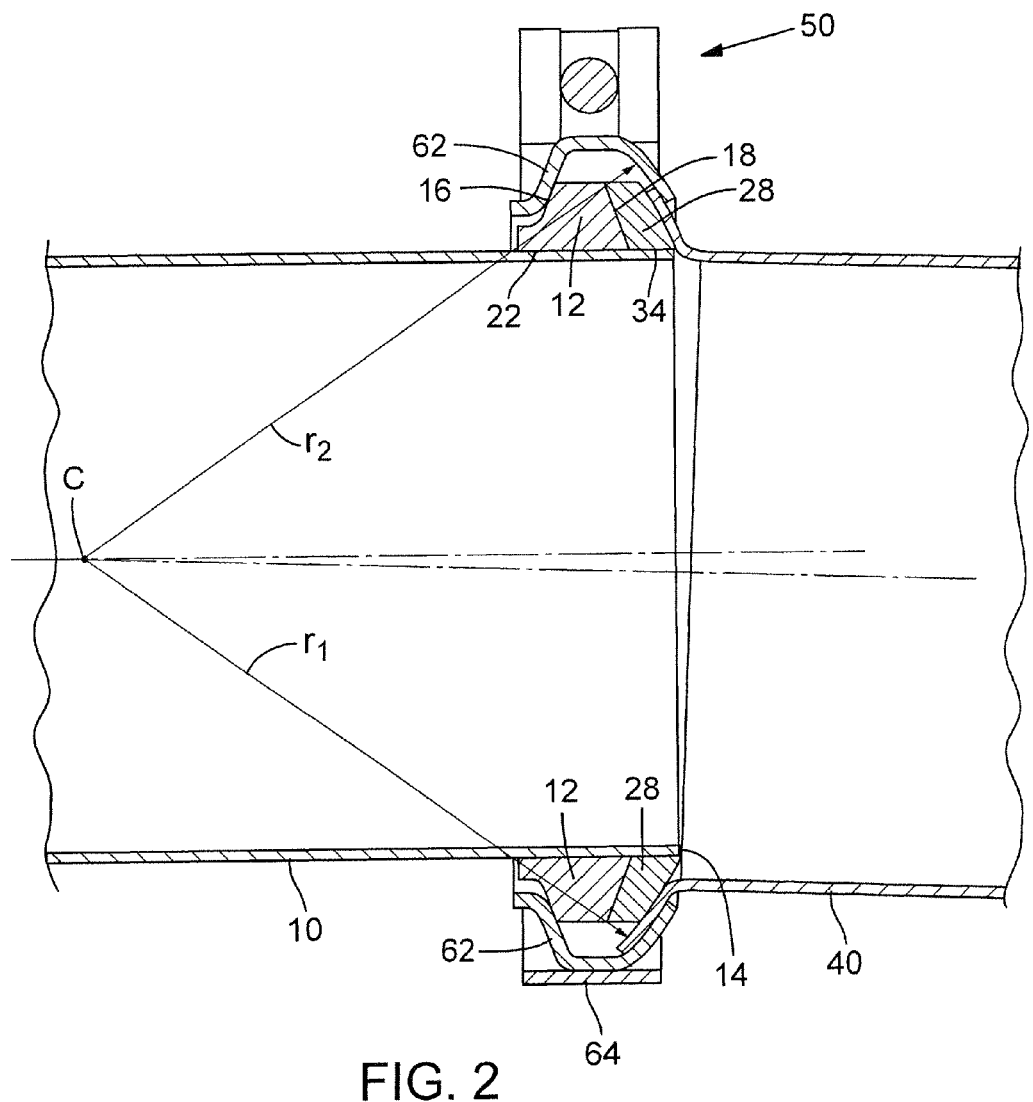
FIG. 2 is a cross-sectional view of an exemplary conduit coupling.

In accordance with this disclosure, engagement surfaces 32, 44, 46 and 60 are desirably spherical with the radius of curvature of the surfaces 44 and 32 being the same (for example, the radius $r_1$ shown in FIG. 2) and the radius of curvature of surfaces 46 and 60 being the same (for example, the radius $r_2$ shown in FIG. 2). In addition, the radii of curvature of the engagement surfaces 32, 44, 46 and 60 desirably have the same center (i.e., the surfaces have the same center of curvature), with the curved portion of such surfaces thereby being concentric with one another. The center of curvature of the engagement surfaces 32, 44, 46 and 60 can be a point on the longitudinal center axis of the conduit 10 (for example, the point C shown in FIG. 2). In the FIG. 3 embodiment, the inner surface 37 and outer surface 32 of gasket 33 can be spherical and the concave inner surface 37 can be attached to, or positioned to abut, a corresponding convex spherical surface 35 of middle portion 29. Alternatively, those portions of these surfaces that may end up engaging one another, while accommodating misalignment, can have these complimentary spherical configurations.

The use of concentric spherical engagement surfaces and the deformability of the adapter 28 can facilitate adjustment of the flared end 42 of the second conduit 40 in various directions relative to the clamp segment 62 and the adapter 28 while maintaining flush, annular areas of contact between the clamp segment 62 and the flared end 42 and between the flared end 42 and the adapter 28. For example, in some embodiments the second conduit 40 can be adjusted by rotating about the longitudinal center axis of the second conduit, pivoting about a point on the longitudinal center line of the first conduit (e.g., the center of curvature of the engagement surfaces), translating in the direction of the longitudinal center axis of the first conduit, and/or combinations of these adjustments, while maintaining a tight seal between the first and second conduits. As a result, the construction accommodates greater degrees of misalignment between the pipe/component 10 and pipe/component 40 while still permitting a tight seal to be achieved between these components when the clamp 50 is tightened. Thus, the longitudinal center axis of pipe/component 40 can be skewed from the longitudinal center axis of pipe/component 10 in three degrees (x, y and z directions) while still accomplishing and maintaining a tight seal between pipe/component 10 and pipe/component 40.

Having illustrated and described the principles of our invention with reference to at least one embodiment thereof, it should be apparent to those of ordinary skill in the art that the at least one embodiment can be modified in arrangement and detail without departing from the principles thereof. We claim all such modifications that fall within the scope of the following claims.

We claim:

1. A conduit coupling, comprising:
   a first conduit;
   an annular flange on an outer surface of the first conduit adjacent to an end of the first conduit;
   an annular adapter coupled to the outer surface of the first conduit, the adapter comprising a body including an annular first engagement surface positioned adjacent to the flange and an annular second engagement surface that is spherical and convex, the second engagement surface being spaced from and opposed to the first engagement surface;
   a second conduit comprising a flared end, the flared end having an inner surface comprising an adapter engagement surface that is spherical and concave, the adapter engagement surface being engageable with the second engagement surface, the flared end also comprising a clamp engagement surface; and
   a clamp comprising a flared end engagement surface that is engageable with the clamp engagement surface, the clamp being configured to urge the annular flange, the adapter, and the flared end together upon tightening the clamp, wherein the flared end engagement surface of the clamp is spherical and concave and wherein the clamp engagement surface of the flared end is spherical and convex.

2. The coupling of claim 1, wherein the adapter comprises a rigid middle portion between first and second gasket portions.

3. The coupling of claim 2, wherein the first and second gasket portions of the adapter comprise a high temperature resistant material.

4. The coupling of claim 3, wherein the middle portion of the adapter comprises steel.

5. The coupling of claim 1, wherein a cross-sectional shape of the adapter, taken in an axial direction of the first conduit, is substantially trapezoidal.

6. The coupling of claim 1, wherein the second engagement surface, the adapter engagement surface, the clamp engagement surface, and the flared end engagement surface have substantially the same center of curvature.

7. The coupling of claim 6, wherein the center of curvature of the second engagement surface, the adapter engagement surface, the clamp engagement surface, and the flared end engagement surface is located on a longitudinal center axis of the first conduit.

8. The coupling of claim 1, wherein the second engagement surface of the adapter and the adapter engagement surface of the flared end have substantially the same radii of curvature.

9. The coupling of claim 1, wherein the first and second engagement surfaces converge moving away from a longitudinal center axis of the first conduit.

10. The coupling of claim 1, wherein at least one of the first and second conduits is coupled to an engine or an exhaust after treatment device.

11. A conduit coupling, comprising:
    a first conduit having a first longitudinal center axis, a first end portion, and an annular flange on an outer surface of the first end portion;
    a second conduit having a second longitudinal center axis and a flared end portion, the flared end portion having an inner surface comprising an adapter engagement surface that is spherical and concave; and
    an annular adapter held in compression and forming a sealed joint between the first and second conduits, the adapter comprising a rigid middle portion between first and second gasket portions that are less rigid than the middle portion, the first gasket portion comprising an annular first engagement surface positioned adjacent to the flange and the second gasket portion comprising an annular second engagement surface that is spherical and convex, the second engagement surface being spaced from and opposed to the first engagement surface, the adapter engagement surface being engaged with the second engagement surface;

wherein the sealed joint is maintainable while the second conduit is misaligned relative to the first conduit in each of, and in combinations of, the following manners:
(1) translated in a direction of the longitudinal center axis of the first conduit,
(2) rotated about the longitudinal center axis of the second conduit, and
(3) pivoted about a point on the longitudinal center axis of the first conduit.

12. The coupling of claim 1, wherein the second engagement surface of the adapter and the adapter engagement surface of the flared end have a common center of curvature located on a longitudinal center axis of the first conduit.

13. The coupling of claim 1, wherein the clamp engagement surface of the second conduit and the flared end engagement surface of the clamp have a common center of curvature located on a longitudinal center axis of the first conduit.

14. The conduit coupling of claim 11, wherein the second engagement surface of the adapter and the adapter engagement surface of the flared end portion have the same center of curvature, the center of curvature being the point on the longitudinal center axis of the first conduit.

15. A conduit coupling, comprising:
a first conduit;
an annular flange on an outer surface of the first conduit adjacent to and spaced from an end of the first conduit, the flange comprising a first side surface nearer to the end of the first conduit than a second side surface, wherein the first and second side surfaces converge moving away from a longitudinal center axis of the first conduit;
an annular adapter coupled to the outer surface of the first conduit, the adapter comprising a body including an annular first engagement surface positioned adjacent to the flange and an annular second engagement surface that is spherical and convex, the second engagement surface being spaced from and opposed to the first engagement surface, wherein a cross-sectional shape of the adapter, taken in an axial direction of the first conduit, is substantially trapezoidal and the first and second engagement surfaces converge moving away from a longitudinal center axis of the first conduit;
a second conduit comprising a flared end having an inner surface and an outer surface, the inner surface comprising an adapter engagement surface that is spherical and concave and engageable with the second engagement surface of the adapter, the outer surface comprising a clamp engagement surface that is spherical and convex; and
a clamp comprising a flared end engagement surface that is spherical and concave and engageable with the clamp engagement surface of the flared end, wherein the clamp also contacts the second side surface of the flange, and wherein the clamp is configured to urge the annular flange, the adapter, and the flared end together to form a sealed joint between the first and second conduits;
wherein the adapter engagement surface and the second engagement surface of the adapter have substantially the same radii of curvature and the flared end engagement surface and the clamp engagement surface have substantially similar radii of curvature;
wherein the second engagement surface, the adapter engagement surface, the clamp engagement surface, and the flared end engagement surface have substantially the same center of curvature, the center of curvature being a point on the longitudinal center axis of the first conduit; and
wherein the second conduit comprises a second longitudinal center axis and the sealed joint is maintainable when the first and second longitudinal center axes are substantially misaligned.

16. The coupling of claim 15, wherein the adapter comprises a rigid middle portion between first and second gasket portions, wherein the first and second gasket portions of the adapter comprise a high temperature resistant material and the middle portion of the adapter comprises a rigid material.

* * * * *